United States Patent Office 3,849,426
Patented Nov. 19, 1974

3,849,426
CERTAIN PYRIDINIUM CARBAMOYL
COMPOSITIONS
Victor A. Pattison, Tonawanda, N.Y., assignor to Hooker
Chemical Corporation, Niagara Falls, N.Y.
No Drawing. Filed Jan. 12, 1973, Ser. No. 323,178
Int. Cl. C07d 31/44
U.S. Cl. 260—295 CA             8 Claims

ABSTRACT OF THE DISCLOSURE

Resinous compositions of the formula

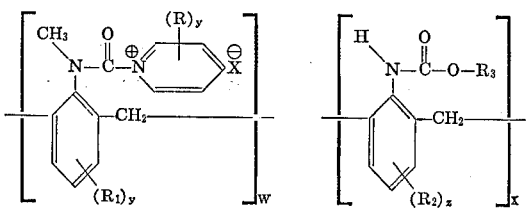

Such resins find utility in textile treatment; as surfactants and in paper treatment.

---

This invention relates to novel water-dispersible resins. More particularly, this invention relates to novel resins and the production thereof from components consisting essentially of (a) formaldehyde, (b) anilines, (c) carbonic dihalides (d) pyridines and (e) fatty alcohols.

The resinous compositions produced in accordance with the present invention are water dispersible and find utility in the treatment, in wither alkaline or acid conditions, of textiles, and paper or the like. The compositions may also be used surfactants.

The novel resins of the present invention are those of the formula

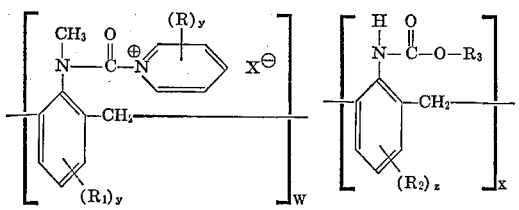

wherein R is an alkyl or aryl radical, generally of from about 1 to about 12 carbon atoms; $R_1$ is an alkyl or aryl radical, generally having from about 1 to about 12 carbon atoms; $R_2$ is an alkyl or aryl radical, generally having from about 1 to about 12 carbon atoms; $R_3$ is a linear alkyl radical, generally having from 5 to about 24 carbon atoms; $w$ is a number having a value of from about 2 to about 10; $x$ is a number having a value of from about .8 to about 4; $y$ is a number having a value of from 0 to 1; $z$ is a number having a value of from 0 to 1; X is a halogen; and the ratio of $w$ is from about 12:1 to 1:2, preferably from about 1:1 to about 3.2.

Exemplary of suitable R radicals are aromatics such as phenyl or naphthyl and alkyl such as methyl, propyl, ethyl, butyl, hexyl and the like.

Exemplary of suitable $R_1$ and $R_2$ radicals are aromatics such as phenyl or naphthyl, or alkyl such as methyl, ethyl, propyl, butyl, hexyl functional derivatives of these radicals, and the like.

Exemplary of suitable $R_3$ radicals are amyl, hexyl, heptyl, dodecyl and the like, having from 5 to 24 carbon atoms.

The molecular weight of the resins may vary from about 500 to as high as about 2500.

The preparation of the novel resins of the present invention is carried out in a process comprising four principal stages or steps:

(a) a N-methyl aniline, or mixture of such anilines, is reacted with formaldehyde and a suitable aniline in a condensation reaction;
(b) the resin from (a) is reacted with a carbonic dihalide;
(c) the resin from (b) is reacted with a fatty alcohol; and
(d) the resin from (c) is reacted with a suitable pyridine.

Suitable carbonic dihalides include phosgene, carbonic dibromide and the like. Preferably, phosgene is utilized in producing the novel resins of the present invention.

Suitable N-methyl anilines for use in formulating the resins of the present invention include, among others, N-methyl aniline; 3,5-dimethyl N-methyl anilines; 4-phenyl N-methyl aniline; 3-hexyl N-methyl aniline; 4-hexyl N-methyl aniline; 3-butyl-N-methyl aniline; 4-naphthyl N-methyl aniline, and the like, as well as suitable mixtures of the N-methyl anilines. The preferred N-methyl aniline is N-methyl aniline.

Suitable non-N-substituted anilines include 3,5-dimethyl aniline, 4-phenyl aniline; 3-hexyl aniline; 3,4,5-trimethyl aniline; 4-naphthyl aniline and the like, as well as suitable mixtures of such anilines.

Suitable pyridines useful in formulating the resins of the present invention are 3,5-dipropyl pyridine; 3-methyl pyridine; 4-naphthyl pyridine; 4-isobutyl pyridine; 4-phenyl pyridine; pyridine and the like, as well as mixtures thereof. The most preferred is unsubstituted pyridine.

The formaldehyde used to prepare the resins may be obtained from such sources as aqueous solutions of formaldehyde, trioxane, paraformaldehyde, or the like. Preferably the formaldehyde, used is a 37% by weight aqueous solution.

The reaction of the aniline compound, N-substituted aniline and formaldehyde is conducted by adding the formaldehyde on a continuous basis to the aniline reactants in a system acidified to a definite acid condition by suitable mineral acid such as hydrochloric acid, the formaldehyde added in such amounts as to effect condensation with the anilines present. Following the addition of the formaldehyde, the reaction mixture is made alkaline by the addition thereto of a suitable alkaline agent, such as aqueous sodium hydroxide, a solid product resulting. The liquid phase is removed by decantation, and the reaction mixture heated to remove residual water. The pH of the reaction system during the addition of the formaldehyde, is generally maintained at 1 or less.

The temperature during step (a) reaction is generally maintained at about 100 to about 160° C., preferably from about 130 to about 160° C. Generally, the time required to effect the condensation is on the order of from about 60 to about 90 minutes.

The reaction product of step (a) is then reacted with the selected carbonic dihalide, preferably phosgene, by adding a suitable solvent to the resin, heating to temperatures sufficient to remove any water present, cooling to less than about 35° C., and adding the carbonic dihalide continuously, in about stoichiometric amounts, to react with the N-methyl amino groups, converting the groups to carbamoyl halide groups and the amino groups to isocyanate groups.

Heat is applied to move the temperature gradually up to about 150° C., evolving hydrochloric acid. The temperature is generally moved through a range of from about 35 to about 150° C. over a period of about 90 minutes. The solvent is removed by distillation, generally at about 120° C. under reduced pressures.

Suitable solvents include the halogenated hydrocarbons, such as chlorobenzene, dichlorobenzene and the like.

Generally, the reaction is completed within a period of from about 90 to about 120 minutes.

The product of step (b) is then reacted with the fatty alcohol, or mixtures of fatty alcohols, by adding the alcohol, with stirring, to the resin in amounts sufficient to convert all isocyanate groups to carbamoyl ester groups, generally at a temperature of about 90° C., the reaction being essentially completed within a period of about 30 minutes. The fatty alcohols suitable for use are those having from about 5 to about 24 carbon atoms, i.e., pentanol to tetracosanol.

The reaction product from step (c) is then reacted with the selected pyridine compound, preferably unsubstituted pyridine, by adding the pyridine in about stoichiometric amounts, based on the carbamoyl halide groups present, stirring and allowing the reaction mixture to stand for about 2-8 hours, at ambient temperatures; however, the reaction may be conducted at elevated temperatures, on the order of about 90° C.

EXAMPLE 1

N-methyl aniline (257 parts by weight) is condensed with formaldehyde and aniline (149 parts by weight) at a pH of about 1 and at temperatures of about 130° C. The reaction is added to dichlorobenzene and heated to remove water present. Phosgene is added to the reaction system, after cooling to below about 35° C., and the temperature gradually increased to about 150° C. over a period of about 90 minutes. Following removal of the solvent, a mixture of 15 grams of the product and 43 grams of stearyl alcohol are heated at 90° C. for about 30 minutes. Pyridine (20 grams) is added to the hot reaction product and stirred for about 15 minutes until homogeneous. The reaction system is sealed and allowed to stand and cool overnight. The product is a friable wax easily dispersed in water at 5 percent by weight.

What is claimed is:

1. A composition having the formula:

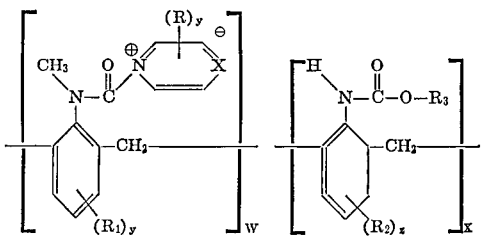

wherein R, $R_1$ and $R_2$ are alkyl radicals having 1 to 6 carbon atoms or aryl radicals having 6 to 10 carbon atoms; $R_3$ is a linear alkyl radical having from 5 to 24 carbon atoms; X is halogen; $y$ and $z$ are numbers from 0 to 1; $w$ is a number from about 2 to 10; $x$ is a number from about 0.8 to 4; and the ratio of $w$ to $x$ is from about 12:1 to 1:2.

2. A composition as defined by claim 1 wherein $y$ and $z$ are zero;

3. A composition as defined by claim 1 wherein X is chlorine.

4. A composition as defined by claim 1 wherein $R_3$ is alkyl containing 18 carbon atoms.

5. A composition as defined by claim 1 wherein the ratio of $w$ to $x$ is about 1:1.

6. A process for preparing a composition having the formula:

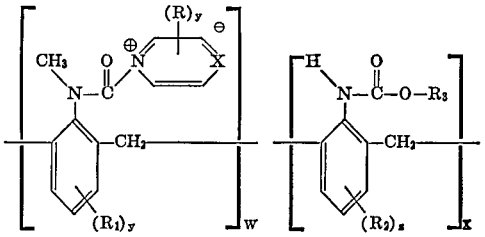

wherein R, $R_1$ and $R_2$ are alkyl radicals having from 1 to 6 carbon atoms or aryl radicals having from 6 to 10 carbon atoms; $R_3$ is a linear alkyl radical having from 5 to 24 carbon atoms; X is halogen; $y$ and $z$ are numbers from 0 to 1; $w$ is a number from about 2 to 10; $x$ is a number from 0.8 to 4; and the ratio of $w$ to $x$ is from about 12:1 to 1:2, which comprises:

(a) reacting formaldehyde with an aniline of the formula

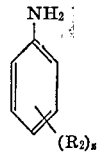

and an N-methyl aniline of the formula

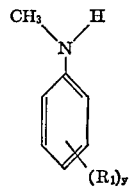

wherein $R_1$, $R_2$, $y$ and $z$ are as previously defined, for a time and at a temperature sufficient to essentially effect complete reaction;

(b) reacting therewith a phosgene, in the absence of water;

(c) reacting the product of (b) with a linear fatty alcohol having from 5 to 24 carbon atoms; and (d) reacting the product of (c) with a pyridine of the formula

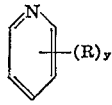

wherein R and $y$ are as previously defined.

7. The composition as defined by claim 1 wherein the ratio of $w$ to $x$ is from about 1:1 to 3:2.

8. The process as claimed in claim 6 wherein the ratio of $w$ to $x$ is from about 1:1 to 3:2.

References Cited

UNITED STATES PATENTS 2,518,266   8/1950   Baird et al. _____ 260—295

OTHER REFERENCES

Karrer: Organic Chemistry, 4th English edition, page 928, Elsevier Pub. Co. (N.Y.), 1950.

ALAN L. ROTMAN, Primary Examiner

U.S. Cl. X.R.

8—116.2; 106—270; 117—154, 155 R; 260—77.5 Q, 77.5 R, 295 E, 295 F, 295 Q.

UNITED STATES PATENT OFFICE
CERTIFICATE OF CORRECTION

Patent No. 3,849,426                 Dated November 19, 1974

Inventor(s) Victor A. Pattison

It is certified that error appears in the above-identified patent and that said Letters Patent are hereby corrected as shown below:

Column 1, line 23, delete " ; " and substitute--- , ---.
Column 1, line 23, following "surfactants" add--- , ---.
Column 1, line 33, "wither" should be---either---.
Column 1, line 35, following "used" insert---as---.
Column 1, line 59, following "w" insert---to x---.
Column 1, line 60, "3.2" should be---3:2---.
Column 1, line 62, "alkyl" should be ---alkyls---.
Column 1, line 65, "alkyl" should be---alkyls---.
Column 1, line 66, following "hexyl" insert--- , ---.
Column 2, line 35, following "formaldehyde" delete " , ".
Column 2, line 50, following "formaldehyde" delete " , ".

UNITED STATES PATENT OFFICE
CERTIFICATE OF CORRECTION

Patent No.  3,849,426    Dated  November 19, 1974

Inventor(s)  Victor A. Pattison

It is certified that error appears in the above-identified patent and that said Letters Patent are hereby corrected as shown below:

Column 3, line 58, following "having" insert -- from --.

Column 4, line 13, following "having" delete "from".

Signed and sealed this 13th day of May 1975.

(SEAL)
Attest:

RUTH C. MASON
Attesting Officer

C. MARSHALL DANN
Commissioner of Patents
and Trademarks